United States Patent [19]
Becker

[11] 3,954,204
[45] May 4, 1976

[54] CELL WHEEL FOR SINGLING AND SEPARATING SEEDS

[75] Inventor: Reinhard Becker, Gieselwerder, Germany

[73] Assignee: Deere & Company, Moline, Ill.

[22] Filed: Mar. 4, 1974

[21] Appl. No.: 448,090

[30] Foreign Application Priority Data
Mar. 6, 1973 Germany............................ 2310979

[52] U.S. Cl.................................. 221/211; 221/266
[51] Int. Cl.²......................................... B23Q 7/04
[58] Field of Search............ 221/266, 211; 222/446, 222/445, 368; 111/77, 78

[56] References Cited
UNITED STATES PATENTS

| | | | |
|---|---|---|---|
| 1,997,791 | 4/1935 | Hoberg | 222/368 X |
| 2,480,897 | 9/1949 | Bettendorf | 222/368 X |
| 2,535,222 | 12/1950 | Milton | 222/368 X |
| 3,606,965 | 9/1971 | Cortelyou | 222/368 X |
| 3,715,057 | 2/1973 | Becker | 221/211 |

*Primary Examiner*—Allen N. Knowles

[57] ABSTRACT

A multiple-row cell wheel assembly having in each row a plurality of circumferentially spaced, outwardly diverging, generally conical seed-receiving cells wherein the cells in one row are circumferentially offset relative to the cells in an adjacent row.

2 Claims, 3 Drawing Figures

CELL WHEEL FOR SINGLING AND SEPARATING SEEDS

BACKGROUND OF THE INVENTION

The invention relates to a cell wheel for singling and separating seed such as corn having cells which are fed from the top and which taper with respect to the receiving side and being provided with openings, each having a diameter smaller than that of the smallest seed.

Such cell wheels are, among others, especially used in single seed planters such as that forming the subject matter of U.S. Pat. No. 3,715,057. The known cell wheels are provided with inner or outer cells, depending upon the method of feeding the cell means for eliminating superfluous seeds. The known machine has a cell wheel with cells tapering outwardly and having bores at the lower or inner ends and extending radially through the die body to its interior cavity. The cell wheel is at first supplied with seed so that several conical cells are filled and then moved past an air nozzle whose air blast is such that all seeds but one are blown out per cell.

These cell wheels allow only a certain number of cells on the periphery and the size of the cells is determined by the seed. Enlarging the diameter of the cell wheel is not practical because a certain peripheral speed of the wheel may not be exceeded. When using such a cell wheel for single corn planters, it will be necessary to vary the distance of the crops in the ground which will be done by changing the speed of the cell wheel depending on the traveling speed of the machine.

Sometimes it is necessary to use relatively high speeds for planting in order to plant the largest possible area per time unit. That again means that the speed of the cell wheel might be increased again, a procedure that is not readily attainable. It is, therefore, extremely difficult, if not impossible, with such machines to gain perfect planting. As already mentioned, an enlargement of the cell wheel is not practical because the peripheral speed of the wheel is limited, namely with reference to the planting capacity because the spacing and size of the cells are determined by the speed.

SUMMARY OF THE INVENTION

The object of the invention is to be seen in the provision of a cell wheel which allows considerably higher planting seeds without causing the wheel to run at excessive speeds. According to the invention, this is attained by constructing the cell wheel body of several side-by-side rows of outwardly tapering cells which are partially circumferentially offset, depending upon the peripheral speed of the wheel and the planting spacing in the ground.

In principle, there is then a cell wheel having a multiple of cells without a decrease in the size of the cells. In some circumstances it will be possible to narrow the cross-section or axial dimension cells because of the side-by-side arrangement of the rows. These rows can then be positioned very close together. Such a method has no adverse influence on the planting and the function of the cells. The small difference which is caused by the circumferential offset of the cell rows when planting is not a disadvantage, as the seeds, when the machine is operated, have only to pass short distances in view of the centrifugal force and actually do not directly enter the ground at the same spacing.

The cell spacing in each row and the offset of the cells is determined by the peripheral speed and by planting spacing. Thus, it is recommendable to construct the cell wheel of several parts. Practically, this is done by the arrangement of several individual cell parts or plates interconnected by separator parts or disks and outer cover plates or disks. For this purpose, single row cell wheels already available can be machined off on the sides to widths corresponding to the necessary dimension. The construction of single cell disks with separator disks has the advantage that there is a possibility for changes or variations with respect to the circumferential offset of the cells according to local requirements. In order to exclude the possibility that some seeds may be retained in the bore, there is provided in the interior periphery of the cell wheel body, for each cell row, an annular groove intersecting the bores at the inner ends of the cells in each row. Arranged in the interior cavity of the cell wheel is a non-rotatable plate, one for each row, operating as a contactor cooperating with the associated groove, so that each cell will ride over this plate after the cell is fed and thereby possible retained seeds are dislodged.

A preferred embodiment of the invention is more clearly explained in the drawings and following description.

DESCRIPTION OF THE PREFERRED EMBODIMENT

Figure 1:
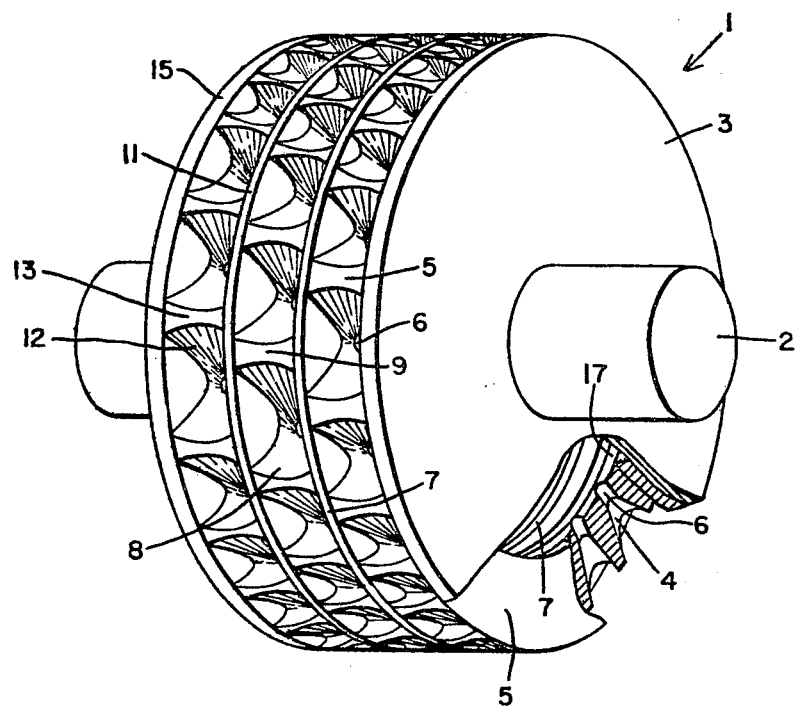
FIG. 1 shows a cell body consisting of three annular cell elements.

In FIG. 1 a cell wheel body is arranged on a cell shaft 2. The cell body consists of three cell elements or disks 5, 9 and 13. The cell elements are provided with cells 4, 8 and 12 respectively. Between the cell elements are separator plates or disks 7 and 11, respectively, and axially at opposite sides of the cell body assembly are outer disks 3 and 15 respectively arranged as covering or closure disks or plates. These covering disks retain the cell body assembly on the shaft.

The individual cell disks are machined at their sides to such a degree that receiving of the seed and the air blast discharge of same are still possible. By this the cell elements are not unnecessarily axially wide and therefore the axial spacing between the individual rows is as small as possible, such that the seeds during planting are not excessively offset in the ground.

Figure 2:
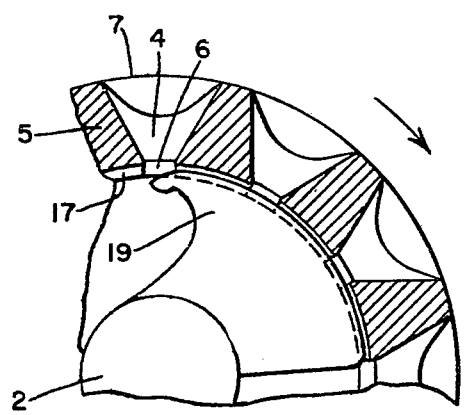
FIG. 2 shows a partial side view of the cell body in section.

FIG. 2 shows a fragmented side section of the body. Each cell 4 is provided with an inner cell bore 6 enabling incoming air to be exhausted radially outwardly through the cell body. During operation, successive cells, after having received seeds, pass an air nozzle (not shown) by which all seeds but one are blown out per cell. Only one seed is retained in each cell because of the lower pressure that exists in the end of the bore, as explained in the above patent. Accordingly, all bores must be smaller than the smallest seed.

Figure 3:
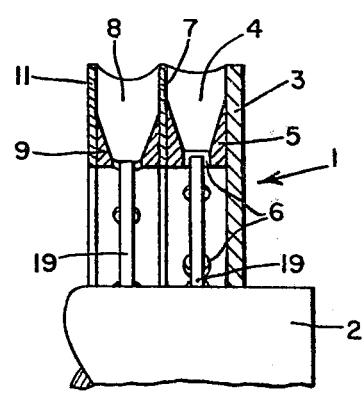
FIG. 3 shows a section through the cell body.

There is a likelihood that some seeds may be retained in the bores 6 and cannot be discharged without assistance. To avoid this, there is, as shown in FIG. 3, an annular groove 17—one per cell element—in the interior of the cell wheel which intersects the cell bores. FIG. 2 shows a fixed or non-rotatable plate 19 in the middle of each cell element and projecting into the corresponding annular groove 17. This plate or discharger covers approximately an angle of 90° and starts directly behind the air nozzle after the fed cell has moved past the usual hopper (not shown). Each cell after being fed rides over this plate 19 such that possible retained seeds are dislodged.

In the cell body 1, the cell disks 5, 9 and 13 are circumferentially offset. The offset depends on the selected peripheral speed, planting spacing and the number of cells desired in the cell disks. The inner periphery of the cell wheel row elements create a relatively larger cavity than the diameter of the shaft 2, and the cell disks are clamped together by the cover disks by any suitable means. In order to establish co-axiality of the wheel elements and shaft, suitable arrangements of cams and grooves, pins and bores, etc. may be used. This arrangement has the advantage that the amount of offset between the elements adjusted because individual cell disks or elements are relatively annularly movable.

It is obvious that the cell body 1 can be made of one piece where the individual cells are then conical openings with correspondingly smaller diameters.

I claim:

1. A cell wheel for singling and separating seeds, comprising a multi-piece annular structure having a plurality of cell elements and a plurality of flat disks, one disk being interposed between elements of a neighboring pair and the axially outermost disks being cover disks, the outside diameter of said structure being substantially uniform throughout its axial dimension, each cell element having a plurality of uniformly angularly spaced identical cells of generally radially inwardly tapering configuration leading respectively to interior openings smaller than the smallest seed to be singled and separated with the interior openings being axially offset inwardly from their respective adjacent disks, adjacent cells in each element being separated by a transverse radial wall integral with the respective element and each cell having a radial innermost portion tapering outwardly from its interior opening and a radially outermost portion that is radially outwardly of its innermost portion and opening axially at its opposite sides to and closed by the respective adjacent disks so that the radial outermost portions of the cells in each element are separated from the cells in the next adjacent element by the intervening disk and the cells in the axially outermost elements are closed by the respective cover disks, and the cells in each element being circumferentially offset from the cells in the next adjacent element.

2. A cell wheel as defined in claim 1, further characterized in that there are at least three elements and four disks and the cells in each element are circumferentially offset from the cells in both of the other two elements.

* * * * *